United States Patent [19]

Lee et al.

[11] 4,456,743

[45] Jun. 26, 1984

[54] POLYURETHANE ADHESIVE COMPOSITION AND A CURATIVE SYSTEM CONTAINING A POLYHYDROXYALKYLPHOSPHINE OXIDE

[75] Inventors: Fui-Tseng H. Lee, Princeton; Joseph Green, East Brunswick, both of N.J.

[73] Assignee: FMC Corporation, Philadelphia, Pa.

[21] Appl. No.: 476,001

[22] Filed: Mar. 17, 1983

[51] Int. Cl.$^3$ ............................................. C08G 18/38
[52] U.S. Cl. ........................................ 528/60; 528/65
[58] Field of Search ................................... 528/60, 65

[56] References Cited

U.S. PATENT DOCUMENTS

| | | | |
|---|---|---|---|
| 3,445,405 | 5/1969 | Vogt ..................................... | 260/2.5 |
| 3,513,113 | 5/1970 | Praetzel et al. ....................... | 260/2.5 |
| 3,925,265 | 12/1975 | Lin ....................................... | 260/2.5 AJ |
| 4,343,914 | 8/1982 | Lee ....................................... | 521/168 |

*Primary Examiner*—Maurice J. Welsh
*Attorney, Agent, or Firm*—Robert D. Jackson; Eugene G. Horsky; Eugene G. Seems

[57] ABSTRACT

A curable polyurethane composition, which gives improved adhesives on curing, comprises an NCO urethane prepolymer and, as the curative therefor, a mixture of an aliphatic hydroxy compound and a polyhydroxyalkylphosphine oxide.

6 Claims, No Drawings

POLYURETHANE ADHESIVE COMPOSITION AND A CURATIVE SYSTEM CONTAINING A POLYHYDROXYALKYLPHOSPHINE OXIDE

This invention relates to polyurethanes, particularly to improved polyurethane adhesive compositions and their preparation.

Polyurethanes comprise a well-known class of polymers, the characteristic structural unit of which is the urethane linkage, $$-\underset{\underset{H}{|}}{N}-C(O)O-.$$

Broadly, such polymers are produced by condensing polyisocyanate with an organic polyol, commonly a polyester or polyether having free hydroxy groups. By varying the reaction conditions and/or using structural derivatives of the basic reactants, it is possible to provide urethane polymers from which a wide variety of plastic articles and materials can be manufactured. For instance, a valuable line of curable adhesives has been developed based on polyurethane resin technology. A curable polyurethane adhesive with which the present invention is particularly concerned, consists of a separate two-component system, one of which contains an NCO terminated prepolymer and the other of which is a low molecular weight aliphatic dihydroxy curative compound, 1,4-butanediol being commonly used. A trihydroxy compound, such as trimethylolpropane (TMP), may also be included as a modifier but the quantity is normally rather small, lest excessive crosslinking occur.

It has now been discovered that improved bonding of the polyurethane adhesive systems aforesaid can be realized by including as part of the low molecular weight dihydroxy curative, a polyhydroxyalkylphosphine oxide of the formula:

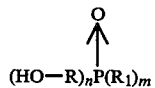

wherein R is alkylene of 3 to 6 carbon atoms, R$_1$ is an alkyl of 2 to 10 carbon atoms, cycloalkyl of 6 to 12 carbon atoms, n is an integer of 2 or 3, it being understood that when n is 2, m is 1 and when n is 3, m is 0, and the provision of polyurethane adhesives containing said polyhydroxyalkylphosphine oxide as a curative component and the cured polyurethane adhesive derived therefrom constitutes the principal object and purpose of the invention.

The NCO terminated prepolymers employed in the practice of the invention are known chemical entities, the description and preparation of which are extensively documented in treatises dealing with urethane elastomer technology. Such intermediates are obtained by condensing an excess of an organic diisocyanate with various polyhydroxy-containing polyesters and polyethers. The percentage of NCO available in the resulting diisocyanate terminated prepolymer will vary with the amount of excess diisocyanate employed. Solvent-free prepolymers are commonly made up at an available NCO percentage of about 6% to 20%. In the well-known treatise "The Development and Use of Polyurethane Products" by E. N. Doyle (McGraw-Hill Book Company) at page 35, the characteristics of some prepolymers derived from polyfunctional polyethers and polyesters in which the diisocyanate is TDI are as follows:

1. TDI/polyester, with 2.5 equivalent weight excess TDI, with the polyester having an equivalent weight of 810 (lightly branched polyethylene succinate).
2. TDI/polyether, with 2.5 excess TDI, with the polyether having an equivalent weight of 325 (polyether diol).
3. TDI/polyether, with 2.5 TDI, with the polyether having an equivalent weight of 980 (polyoxypropylene triol).
4. TDI/polybutadiene homopolymer, with 3.0 excess TDI. The equivalent weight of the homopolymer is 1,150.
5. TDI plus 0.75 equivalent weight of polyester with equivalent weight of 280, plus 0.25 equivalent weight polyether, with an equivalent weight of 960. 3.0 excess TDI was used. The polyester was propylene fumarate and the polyether a diol.
6. TDI plus 0.75 equivalent weight of polyoxypropylene glycol triol, with an equivalent weight of 1,000 plus 0.25 equivalent weight hydroxy ethyl acrylate. 2.5 excess TDI was used. The hydroxy ethyl acrylate had an equivalent weight of 116.
7. TDI plus 0.75 equivalent weight of polyoxypropylene glycol (same as in No. 6) plus 0.25 equivalent weight sorbitol. Excess TDI was 3.0.

Exemplary phosphine oxides within the ambit of the formula aforesaid include:

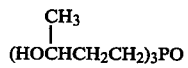

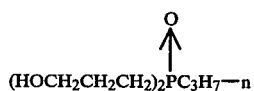

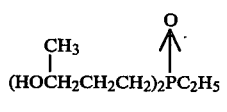

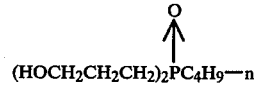

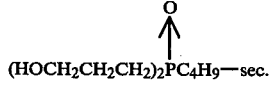

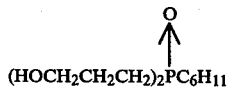

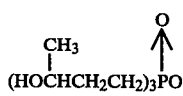

Polyhydroxyalkylphosphine oxides belong to a known class of chemical compounds which are described in the technical literature. They may be prepared by first forming the intermediate phosphine by reacting an excess of an olefinic compound with a phosphine compound in the presence of a free radical catalyst. The phosphine adduct is then contacted with an oxidizing agent such as hydrogen peroxide to give the phosphine oxide. Generally speaking, polyhydroxyalkylphosphine oxides are hydrolytically stable.

In carrying out the invention, an NCO terminated prepolymer is mixed with a low molecular weight, aliphatic polyhydroxy curative compound in the normal manner of preparing a polyurethane curable adhesive composition except that there is included therewith a quantity of a polyhydroxyalkylphosphine oxide aforesaid and the mixture placed between support plates and allowed to cure. Normally, curing is facilitated by heating at about 200° C. The plates are pressed together during curing; pressure does not usually exceed about 100 lbs/m². After curing for about one hour, the adhesive joint is conditioned at room temperature for about 24 hours.

So far as can be ascertained, the extent of improved bonding of the cured adhesive depends on the quantity of polyhydroxyalkylphosphine oxide in the polyurethane curable adhesive formulation. Generally speaking, the polyhydroxyalkylphosphine oxide will run about 10% to about 60% by weight of the total hydroxy curing system. Moreover, the combination of an aliphatic diol and trihydroxyalkylphosphine oxide has superior adhesion compared with the prior art aliphatic diol/triol combination such as the commercial mixture of 1,4-butanediol (BD) and trimethylolpropane (TMP).

The polyurethane curable adhesive compositions of the invention are particularly useful and valuable in that on curing they bond extremely well to aluminum. In some instances, bonding to aluminum was practically the same as on steel. This is unusual and unexpected as good adhesion to aluminum surfaces is recognized in the adhesive art as often being a problem.

Reference is now made to the following examples.

PREPARATION OF ADHESIVES

An NCO terminated prepolymer was prepared by adding in portions 2 moles of melted MDI (4,4'-diphenylmethane diisocyanate) to 1 mole of Polymeg 1000, previously degassed and dried overnight at 90° C. at 1 mm Hg. Polymeg is a difunctional polyether having an equivalent weight of 502.2 and sold by BASF. After the addition, the reagents were allowed to react for one hour at no higher temperature than about 80° C. The resulting prepolymer was kept under dry $N_2$ until ready for use.

A curable adhesive composition was prepared by mixing the prepolymer aforesaid with a polyhydroxyalkylphosphine oxide curative of the invention in the presence of dibutyltin dilaurate as a catalyst. The thoroughly blended mixture was spread on the surface of 0.5"×1" degreased metal strips by means of a spatula. Another metal strip was placed with its clean side in contact with the coating. The resulting assembly was inserted in a press, clamped under pressure of not more than about 100 lbs/m² and heated at 200° C. for one hour and then allowed to condition at room temperature for 24 hours.

Using the procedure aforesaid, various adhesive formulations of the prepolymers and curative were prepared and tested. These examples and the shear strength data are set forth in Table I.

TESTING OF ADHESIVES

Lap-Shear Strength-ASTM-D-3164 a. Testing machine was adjusted in such a way that breaking load for the specimens fell between 15%-85% of full scale.

b. A rate of loading (1200-1400 psi/min) was applied.

c. Speed of crosshead=0.05 in/min.

Failing stress was calculated as (pounds-force)/(in²-area)

Turning to the Table, it will be observed that where 1,4-butanediol (BD) is used in combination with BHPPO alone or with THPPO, Examples 2, 3, 4, 7 and 8, excellent adhesion to steel and aluminum was achieved. With higher amounts of BHPPO, adhesion increased; Examples 2, 3 and 4. Improved adhesion likewise resulted with increased amounts of THPPO. The best adhesion resulted when both BHPPO and THPPO were both used in the curative system.

Example 8 is particularly noteworthy in that the adhesion to aluminum was excellent, virtually as good as to steel.

In Example 9, the THPPO triol of the invention was replaced with the prior art control TMP triol. The adhesion to aluminum dropped to 291.7 psi compared with 541.66 psi of Example 7 containing THPPO triol.

The prior art with BD and TMP compositions a. and b. gave much lower shear strengths than were obtained with the polyhydroxyalkylphosphine oxide curatives of the inventions.

TABLE I

| Example | Formulation | Steel Strip | Aluminum Strip |
|---|---|---|---|
| 1 | (1,4BD, eq. wt. 80% + BHPPO by eq. wt. 20%) | | |
| | polyurethane prepolymer, g | 5.00 | 5.00 |
| | 1,4BD, g | 0.25 | 0.25 |
| | BHPPO, g | 0.06 | 0.06 |
| | NCO/OH | 1.10 | 1.10 |
| | Lap Shear, strength, psi | 625.00 | 510.40 |
| 2 | (1,4BD by eq. wt. 60% + BHPPO by eq. wt. 40%) | | |
| | polyurethane, prepolymer, g | 5.00 | 5.00 |
| | 1,4BD, g | 0.22 | 0.22 |
| | BHPPO, g | 0.15 | 0.15 |
| | NCO/OH | 1.10 | 1.10 |
| | Lap Shear, strength, psi | 690.00 | 660.00 |
| 3 | (1,4BD by eq. wt. 40% + BHPPO by eq. wt. 60%) | | |
| | polyurethane prepolymer, g | 5.00 | 5.00 |
| | 1,4BD, g | 0.17 | 0.17 |
| | BHPPO, g | 0.26 | 0.26 |
| | NCO/OH | 1.10 | 1.10 |
| | Lap Shear, strength, psi | 791.66 | 750.00 |
| 4 | (1,4BD by eq. wt. 90% + THPPO by eq. wt. 10%) | | |
| | polyurethane prepolymer, g | 5.00 | 5.00 |
| | 1,4BD, g | 0.26 | 0.26 |
| | BHPPO, g | 0.03 | 0.03 |
| | NCO/OH | 1.10 | 1.10 |
| | Lap Shear, strength, psi | 460.00 | 229.00 |
| 5 | (1,4BD by eq. wt. 80% + THPPO by eq. wt. 20%) | | |
| | polyurethane, prepolymer, g | 5.00 | 5.00 |
| | 1,4BD, g | 0.24 | 0.24 |
| | THPPO, g | 0.06 | 0.06 |
| | NCO/OH | 1.10 | 1.10 |
| | Lap Shear, strength, psi | 680.00 | 620.00 |
| 6 | (1,4BD by eq. wt. 70% + BHPPO by eq. wt. 20% + THPPO by eq. wt. 10%) | | |
| | polyurethane prepolymer, g | 5.00 | 5.00 |
| | 1,4BD, g | 0.22 | 0.22 |

TABLE I-continued

| Example | Formulation | Steel Strip | Aluminum Strip |
|---|---|---|---|
| | BHPPO, g | 0.06 | 0.06 |
| | THPPO, g | 0.03 | 0.03 |
| | NCO/OH | 1.10 | 1.10 |
| | Lap Shear, strength, psi | 740.84 | 541.66 |
| 7 | (1,4BD by eq. wt. 60% + BHPPO by eq. wt. 20% + THPPO by eq. wt. 20%) | | |
| | polyurethane prepolymer, g | 5.00 | 5.00 |
| | 1,4BD, g | 0.20 | 0.20 |
| | BHPPO, g | 0.07 | 0.07 |
| | THPPO, g | 0.07 | 0.07 |
| | NCO/OH | 1.10 | 1.10 |
| | Lap Shear, strength, psi | 770.00 | 740.00 |
| 8 | (1,4BD by eq. wt. 70% + BHPPO by eq. wt. 20% + TMP by eq. wt. 10%) | | |
| | polyurethane prepolymer, g | 5.00 | 5.00 |
| | 1,4BD, g | 0.21 | 0.21 |
| | BHPPO, g | 0.06 | 0.06 |
| | TMP, g | 0.03 | 0.03 |
| | NCO/OH | 1.10 | 1.10 |
| | Lap Shear, strength, psi | 562.50 | 291.70 |
| | PRIOR ART | | |
| a | (1,4BD, eq. wt. 100%) | | |
| | polyurethane prepolymer, g | 5.00 | 5.00 |
| | 1,4BD, g | 0.27 | 0.27 |
| | NCO/OH | 1.10 | 1.10 |
| | Lap Shear, strength, psi | 437.50 | 291.70 |
| b | (1,4BD by eq. wt. 90% + TMP by eq. wt. 10%) | | |
| | polyurethane prepolymer, g | 5.00 | 5.00 |
| | 1,4BD, g | 0.24 | 0.24 |
| | TMP, g | 0.03 | 0.03 |
| | NCO/OH | 1.10 | 1.10 |
| | Lap Shear, strength, psi | 291.67 | 208.34 |

BD = 1,4-butanediol
TMP = trimethylolpropane
THPPO = tris(3-hydroxypropyl) phosphine oxide
BHPPO = sec. butyl bis(3-hydroxypropyl) phosphine oxide

What is claimed is:

1. In a polyurethane composition for producing an adhesive when cured, said composition comprising an NCO terminated urethane prepolymer from a polyol selected from the class consisting of polyhydroxy functional polyethers and polyesters and a polyhydroxy aliphatic curative system, the improvement of incorporating in the curative system from about 10% to about 60% based on the weight of the curative system of a polyhydroxyalkylphosphine oxide of the formula:

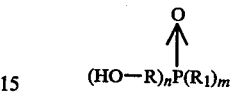

$$(HO-R)_n P(R_1)_m$$

wherein R is alkylene of 3 to 6 carbon atoms, $R_1$ is alkyl of 2 to 10 carbon atoms, cycloalkyl of 6 to 12 carbon atoms and n is an integer of 2 to 3, it being understood that when n is 2, m is 1 and when n is 3, m is 0.

2. The composition of claim 1 wherein the phosphine oxide is:

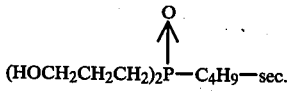

$$(HOCH_2CH_2CH_2)_2 P-C_4H_9-\text{sec.}$$

3. The composition of claim 1 wherein the phosphine oxide is:

$$(HOCH_2CH_2CH_2)_3 PO.$$

4. A cured polyurethane adhesive from the curable composition of claim 1.

5. The cured polyurethane adhesive from the curable composition of claim 2.

6. The cured polyurethane adhesive from the curable composition of claim 3.

* * * * *